July 18, 1961 — L. O. UPTON — 2,992,586
MULTIPLE PATH LIGHT-CONDUCTING DEVICES AND METHOD
AND APPARATUS FOR MAKING SAME
Filed March 5, 1958
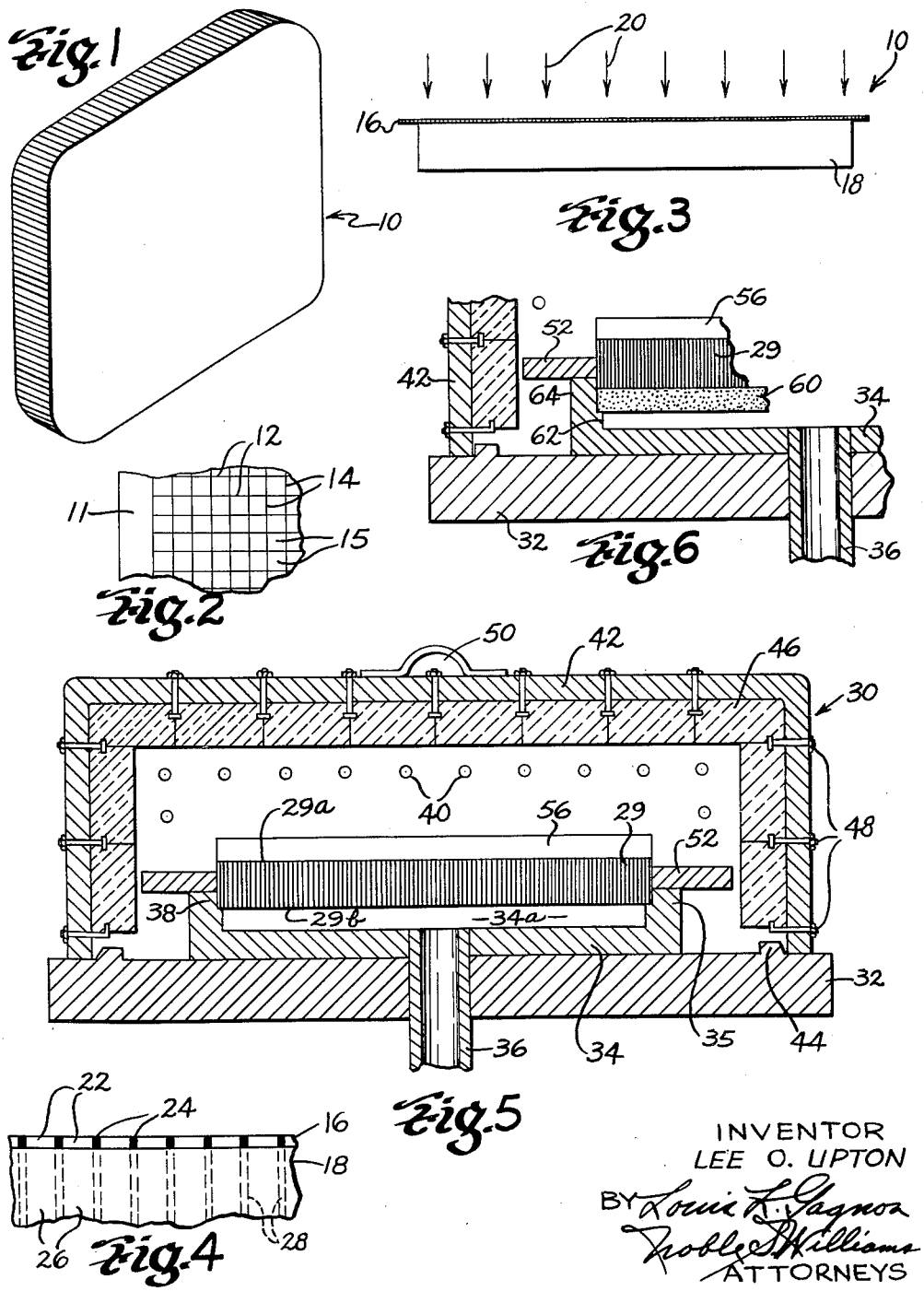
INVENTOR
LEE O. UPTON
ATTORNEYS

United States Patent Office 2,992,586
Patented July 18, 1961

2,992,586
MULTIPLE PATH LIGHT-CONDUCTING DEVICES AND METHOD AND APPARATUS FOR MAKING SAME
Lee O. Upton, Sturbridge, Mass., assignor to American Optical Company, Southbridge, Mass., a voluntary association of Massachusetts
Filed Mar. 5, 1958, Ser. No. 719,292
2 Claims. (Cl. 88—1)

This invention relates to integrally formed plate-like light-conducting or light-transmitting devices of a type having a very large number of very small individual closely spaced light-conducting portions extending therethrough, said light-conducting portions each being formed of a clear glass of relatively high refractive index and being maintained in spaced side-by-side parallel relation to each other by a honeycomb-like matrix portion formed of a glass of a relatively lower refractive index; the construction and arrangement being such as to effect in the finished device a unitary rigid structure of considerable width and length in comparison to its thickness and providing a very large number of individual optically insulated light paths therethrough. The invention also includes a method and apparatus for rapidly, efficiently, accurately and inexpensively making such devices.

There are many different places in which real utility can be made of plate-like devices of the above character provided the cost and difficulty of making such devices is not too great. For example, a rear projection screen for motion picture purposes, or the face plate of a television picture receiving tube, is of considerable width and length in comparison to its thickness, and to making such a screen or plate in the form of a unitary rigid structure having a very large number of individual light paths therethrough would be an expensive if not an impossible proposition if such a structure had to be built up by putting together and cementing in side-by-side relation many thousands of individual small light-conducting rods or filaments. Furthermore, since the size of the individual light-conducting elements of such a screen or plate will govern to a large degree the resolution characteristics to be provided thereby, it follows that when the resolution requirements are high a greatly increased number of individual elements would be required and this would merely greatly increase the cost and difficulty in making such a screen or plate.

The apparatus of the present invention and the method of manufacture are such as to produce plates or screens of the character described having a very large number of individual light-conducting portions therein in a rapid, accurate, inexpensive and easily performed manner and in such a way that the many small individual light-conducting portions will be of substantially identical character and accordingly will provide a similarity or uniformity of appearances in all parts of the screen; when the plate or screen is being viwed from a prescribed distance during use thereof.

Briefly stated the present invention may be carried into effect by first drawing on paper a suitable pattern defining many similar adjacent areas, photographically forming on film a copy of said pattern of a size equal to or slightly larger than the size of the plate or screen to be produced, positioning said developed film pattern upon a sheet of photo-sensitive glass of a relatively low refractive index, subjecting this film covered glass to ultraviolet radiation in such a manner that a very large number of relatively small individual closely spaced portions of the photo-sensitive glass will be irradiated for a length of time sufficient to render same capable of developing an opaque condition when later subjected to a known heating technique, thereafter etching away by a hydrofluoric acid bath the glass of the many opaque portions so as to form many minute passageways through the glass plate, and then simultaneously filling each of these minute passageways thus forming a honeycomb-like sheet or plate of glass with a glass of a higher refractive index in such a way as to become firmly bonded to adjacent portions of surrounding low index glass. After suitable grinding and polishing of opposite faces a multiple path light-conducting element or device of the character described will be produced.

It is accordingly an object of the present invention to provide a rapid, efficient, accurate and inexpensive method of manufacturing multiple path light-transmitting plates, screens and the like of appreciable width and length and in which a very large number of very small individual optically insulated light paths are formed.

It is also an object of the invention to provide multiple path light-conducting screens and plates resulting from the practice of said method.

It is a further object of the present invention to provide novel and useful apparatus for carrying out said method for the manufacture of multiple path light-conducting devices and the like.

Other objects and advantages of the invention will become apparent from the detailed description which follows when taken in conjunction with the accompanying drawings in which:

FIG. 1 is a perspective view of a multiple path light-conducting plate or screen made in accordance with the present invention;

FIG. 2 is a plan view of a portion of a pattern for use in carrying out the method;

FIG. 3 is a side elevational view of photographic film and a photo-sensitive glass plate for use in performing the method of the invention;

FIG. 4 is an enlarged fragmentary view of a portion of the film and plate of FIG. 3;

FIG. 5 is a vertical sectional view of apparatus which may be used in the formation of multiple path light-conducting devices according to the present invention; and FIG. 6 is a fragmentary vertical sectional view of a modified form of apparatus which may be used in carrying out the present invention.

Referring to the drawing in detail, it will be appreciated that there is numerically indicated by the numeral 10 in FIG. 1 a glass face plate or screen of considerable length and width in comparison to its thickness. It should be appreciated that this plate comprises a very large number of very small individual closely spaced light-conducting paths therethrough and that this screen or plate 10 may be readily and accurately formed in the following manner.

In performing the method of the present invention, it is desirable to first form a pattern having many like small adjacent discrete and clearly defined areas thereon which are like those desired in the finished screen or face plate except that these areas on the pattern may differ somewhat in size from the size of the areas to be formed on the plate or screen. This pattern may best be formed by accurately ruling upon white drawing paper or the like 11, a very large number of equally spaced black lines, for example, at right angles to each other, such as indicated at 12 and 14, so as to form many individual small areas 15 in closely spaced side-by-side relation to each other. These areas, as shown, are square but other geometric shapes, such as triangles and hexagons, may as readily be used.

Thereafter this drawing is photographically reproduced on film either by contact printing or by projection printing depending partly upon whether or not an enlarged or reduced image size is desired in the small areas of the pattern being formed on the photographic film. It will be appreciated, of course, that in this manner many like individual small areas may be formed in the film pattern which are of almost any small size desired, and as stated above the area size so produced will be controlled in accordance with the degree of resolution desired in the finished face plate or screen. A photographic film having a pattern so formed thereon is generally indicated at 16 in FIG. 3. Thus this film pattern 16 will provide a very large number of opaque lines which will individually separate the large number of small clear transparent film areas from each other. It will be readily appreciated that the width of the opaque lines desired on the film pattern may be controlled directly by the width initially provided in the drawn lines 12 and 14 on the paper 11.

This pattern formed upon the film is also indicated in somewhat enlarged form at 16 in FIG. 4 and when placed upon a plate 18 of photo-sensitive glass and subjected to substantially parallel or collimated radiation, for example ultraviolet light, as indicated by arrows 20 in FIG. 3, for a sufficient length of time plate 18 will be altered by this radiation; somewhat in the manner indicated in FIG. 4 wherein small areas 22 indicate transparent portions of the film 16 and darkened areas 24 therebetween indicate opaque film areas and wherein the ultraviolet or equivalent radiation passing directly through areas 22 will affect individual small columns 26 of the photosensitive glass which are spaced from one another by relatively thin separating portions 28 of the glass which have not been subjected to this radiation. Photosensitive glasses which are suitable for the above purpose are described in U.S. Patents 2,515,936—2,515,943. The irradiated columns 26 of the plate 18 are thus capable of developing an opaque or semi-opaque condition when subjected to a heat developing step at a temperature a little below the softening range of the glass. Another condition obtained at the same time is that of making the columns 26 of heat developed glass far more susceptible to hydrofluoric acid attack than the unaltered parts 28.

Accordingly when the exposed heat treated plate 18 is thereafter subjected for a suitable time to a hydrofluoric acid bath, while preferably being continuously agitated, there will be produced a chemical etching or eroding away of the glass which forms the columns 26 at a rate which is far greater than the rate at which the unexposed portions of the glass will be affected by this acid. Also it will be appreciated that since the plate 18 is at such a time completely submerged in the hydrofluoric acid bath such erosion at both faces of the plate will occur. The etching or erosion of the exposed heat treated glass is continued for such a time that not only will a clear passageway be formed through the plate 18 at each and every location at which the ultraviolet radiation passed therethrough but also until a substantially smooth nearly straight sided side wall surface will be formed at each clear passageway so produced. Thus a honeycomb-like plate or porous structure 29 of glass providing many hundreds of individual like passageways therethrough will be produced with each passageway having smooth and nearly parallel highly reflective surfaces.

This porous plate 29 may then be placed within a heating chamber, such as indicated at 30 in FIG. 5, for carrying out a subsequent step in the formation of a finished multiple path light conducting device or structure of the character described. Such a heating chamber may comprise a supporting base 32 upon which is supported a vacuum shoe 34 having an annular rim 35 upon which the porous plate 29 may be positioned. A suction pipe 36 is arranged to extend through the base 32 and shoe 34 in such a manner that substantially the entire lower surface or face of the porous plate 29 will be exposed thereto. The rim 35 has provided therein a narrow circumferential recess or shoulder 38 shaped and adapted to receive the peripheral edge of the plate 29 therein. This recess 38 serves to accurately locate the porous plate 29 in the heating chamber 30 and particularly relative to a plurality of electrical heating elements 40 which are carried by a removable cover portion 42 of the heating chamber 30. The cover 42 is suitably arranged so as to fit over an upstanding flange or other aligning means 44 carried by the base 32, and as indicated the entire interior of this cover portion may be heat insulated by fire bricks or other refractory material 46 secured to the cover 42 by bolts or like attachment means 48. A bail 50 secured to the cover 42 serves as convenient means for lifting the cover from the base and for positioning same thereon when desired.

Upon the upper face 29a of the porous plate 29 of low index glass after same has been positioned in recess 38 of the shoe 34 will be placed a sheet of clear high index low melting type of glass 56, and preferably around the plate 29 as indicated will be closely fitted an impervious insulating ring or the like 52 of suitable refractory material so that when a suction is produced through the pipe 36 upon the lower face 29b of the plate very little if any air will leak down around the plate 29 and into the interior 34a of the vacuum shoe 34.

Accordingly when the heating elements have been energized for a time sufficient to uniformly heat and soften the sheet of high index glass 56 and a suction is produced upon the lower face 29b of the plate 29 the softened high index glass of the sheet 56 will be drawn substantially uniformly into each and every individual minute passageway formed in the porous plate 29.

The temperature and degree of vacuum provided at such a time by the chamber 30 will be, of course, suitably controlled so that each passageway in the low index porous plate 29 inwardly of its peripheral edge will be substantially filled and sealed by a column of high index glass. The impregnated plate or rough blank thus formed will in effect comprise a matrix or honeycomb-like supporting component of low index glass completely surrounding and separating many elongated individual columns of high index glass embedded therein and in such a manner that the interfaces formed between each column of high index glass and its surrounding matrix glass will serve as a highly reflective surface. Thus after suitable annealing and cooling, when the opposite faces of this unitary impregnated plate or blank have been suitably ground and polished in accordance with the finished optical properties desired therein a multiple path light-conducting device like that shown at 10 in FIG. 1 will be formed having therein many columns of glass which will act to transmit light received at one end surface of the device through the device to the opposite face thereof.

It may be desirable to provide, instead of a peripheral flange for supporting the porous plate 29 disclosed in FIG. 5, a permeable supporting block 60 as shown in FIG. 6, and the block may be arranged to fit within a peripheral recess 62 similar to recess 38 in FIG. 5. The surrounding rim 64, however, is extended upwardly somewhat so that thereafter the porous plate 29 of low index glass may be supported on the block 60 and centered by rim 64 while being subjected to a suction through pipe 36. Thus when an overlying sheet 56 of low melting high index glass is heated and softened it may be drawn into the many individual passageways in the porous plate 29 by the suction acting directly through permeable supporting block 60. There are available many different known forms of permeable materials suitable for the formation of such a supporting plate 60; one such material being silicon carbide. Also certain known types of fired but unglazed porous clay can also be used. Such a block would preferably have substantially the same surface shape as that provided upon the bottom face of the porous plate 29. Accordingly at times the permeable supporting block 60 might provide a better way of supporting the honeycomb-like plate 29 during the filling or impregnating thereof with the high index glass than would be the case if the peripheral supported arrangement of FIG. 5 were used.

From the foregoing description, it will be appreciated that a new and improved form of multiple path light-conducting or image transfer optical device, screen or plate, which may be of appreciable size when desired, may be made by following the teachings of the present invention and also that various changes therein may be made by those skilled in the art without departing from the spirit of the invention as expressed by the accompanying claims.

Having described my invention, I claim:

1. The method of forming a plate-like optical image transfer device of appreciable width and length and having a very large number of individual closely spaced light-conducting paths extending therethrough, said method comprising photographically producing upon film at a reduced scale a pattern comprising a very large number of very small like transparent areas in closely spaced relation to each other and separated from one another by thin opaque lines, positioning said pattern in contacting relation to a surface of a plate of photosensitive glass of relatively low refractive index, directing a collimated beam of ultra-violet light through said pattern so as to expose spaced portions extending through said photosensitive glass plate to the irradiating effect thereof, heat-treating the exposed photosensitive glass for a time sufficient to develop said pattern, subjecting said photosensitive glass plate to an acid-etching bath for a time sufficient to erode away the major portion of the glass of said exposed spaced portions and thereby produce a porous honeycomb-like plate of low index glass having a very large number of closely spaced elongated smooth surfaced passageways extending therethrough, positioning clear glass of a relatively higher refractive index and lower melting characteristics upon said porous plate so as to overlie the major part of its upper surface, heating said high index glass to a softening temperature, subjecting the underside of said porous plate to a suction effect so as to cause the softened high index glass to flow into all of said small passageways therein and form small columns of clear glass of a relatively high refractive index disposed in closely spaced relation to each other within the passageways in said low index glass plate, subjecting the filled glass plate to annealing and cooling steps and subjecting at least one of the faces of the unitary structure so formed to a grinding and optical finishing process so as to form a multiple path optical image transfer device of the character described.

2. The method of forming a plate-like optical image transfer device of appreciable width and length and having a very large number of individual closely spaced elongated light-conducting paths of clear high index glass which are optically insulated from one another by low index glass extending therethrough, said method comprising forming on sheet material sets of closely spaced parallel contrasting lines in intersecting relation to each other in such a manner as to define a geometric pattern having a very large number of closely spaced like lighted areas spaced from one another by thin opaque lines, photographically reproducing said pattern at a reduced scale upon film in such a manner as to provide a multiplicity of very small transparent areas of a predetermined size separated from one another by substantially opaque lines, positioning said photographic pattern so produced in contacting relation to a surface of a plate of photosensitive glass of relatively low refractive index, directing collimated ultra-violet light through said film pattern so as to expose spaced portions extending through said photosensitive glass plate to the irradiating effect thereof, heat-treating the exposed photosensitive glass for a time sufficient to develop said pattern therein, subjecting said photosensitive glass plate so developed to an acid-etching bath for a time sufficient to erode away the major portion of the glass of said exposed spaced portions and thereby produce a porous honeycomb-like plate of low index glass having a very large number of closely spaced elongated smooth surfaced substantially parallel sided passageways extending therethrough, positioning clear glass of a relatively high refractive index and lower melting characteristics upon said porous plate so as to overlie the major part of its upper surface, heating said high index glass to a softening temperature, subjecting the underside of said porous glass plate to a suction effect which is sufficient to cause the softened high index glass to flow into all of said small passageways and form small smooth sided columns of clear glass of a relatively high refractive index disposed in closely spaced relation to each other within said low index glass plate, subjecting the unitary structure so formed to annealing and cooling steps, and subjecting at least one face of said unitary structure to a grinding and optical finishing process so as to form a plate-like optical image transfer device of the character described.

References Cited in the file of this patent
UNITED STATES PATENTS

| | | |
|---|---|---|
| 846,823 | Cazin | Mar. 12, 1907 |
| 1,236,937 | Hough | Aug. 14, 1917 |
| 2,311,704 | Simison | Feb. 23, 1943 |
| 2,331,946 | Pazsiczky et al. | Oct. 19, 1943 |
| 2,552,395 | Borel et al. | May 8, 1951 |
| 2,628,160 | Stookey | Feb. 10, 1953 |
| 2,653,516 | Johnson | Sept. 29, 1953 |
| 2,749,794 | O'Leary | June 12, 1956 |
| 2,780,891 | Arbeit | Feb. 12, 1957 |
| 2,825,260 | O'Brien | Mar. 4, 1958 |